Aug. 9, 1960
J. V. LANDRY
2,948,563
MEANS FOR RELEASABLY MOUNTING A STORE ON AN AIRCRAFT
Filed Sept. 28, 1955
3 Sheets-Sheet 1
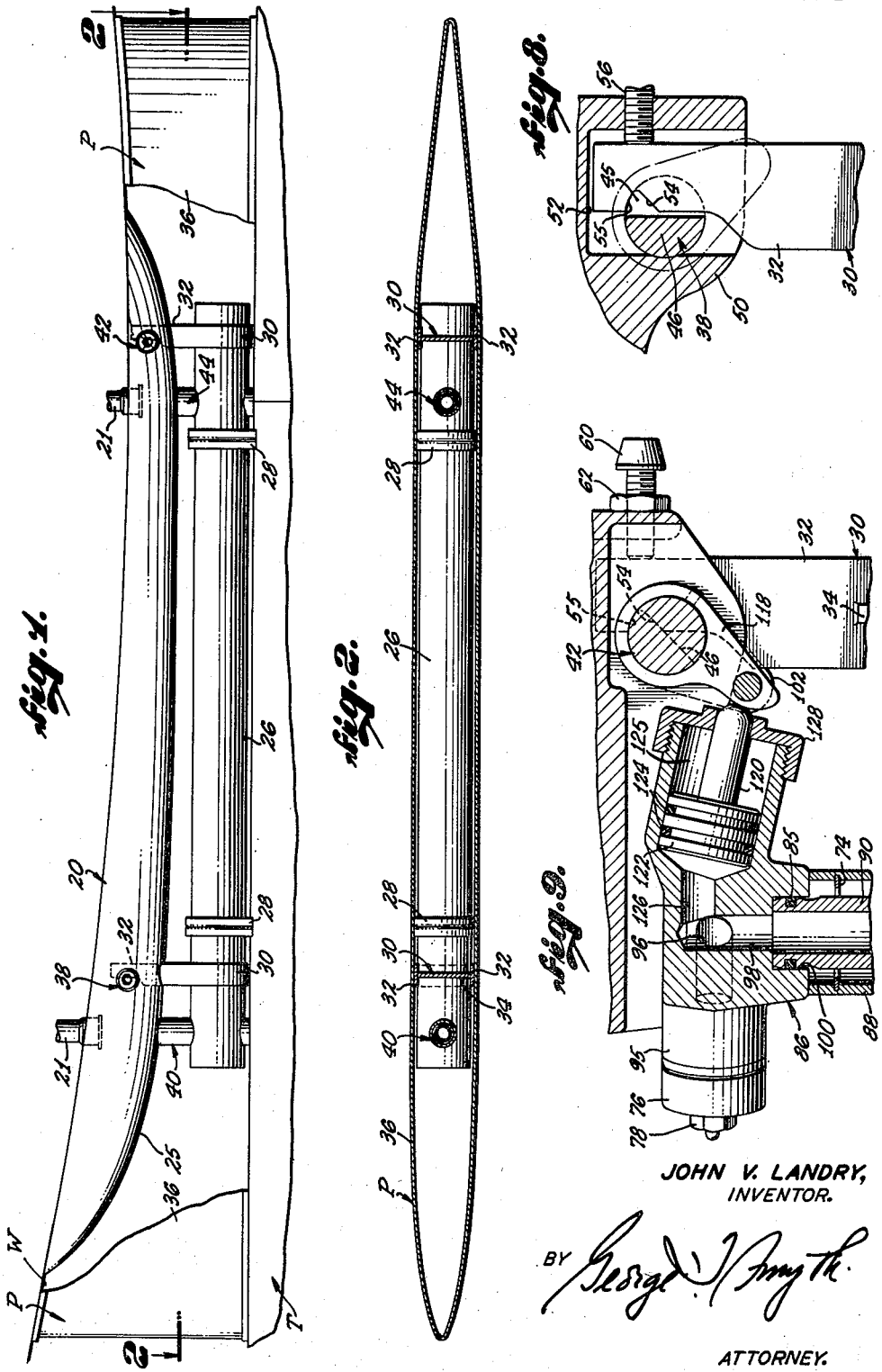
JOHN V. LANDRY,
INVENTOR.
BY George J. Smyth
ATTORNEY.

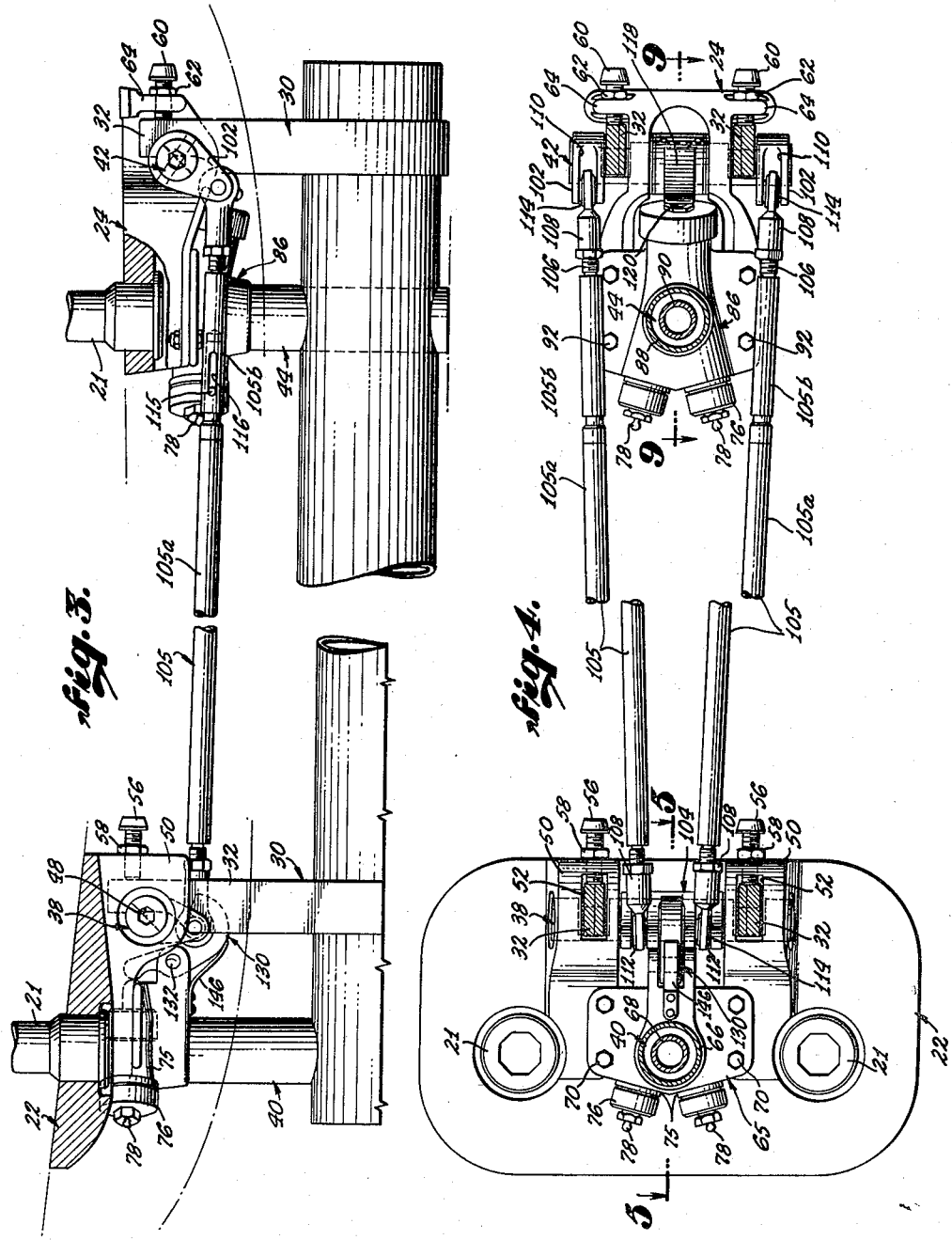

Aug. 9, 1960 J. V. LANDRY 2,948,563
MEANS FOR RELEASABLY MOUNTING A STORE ON AN AIRCRAFT
Filed Sept. 28, 1955 3 Sheets-Sheet 3
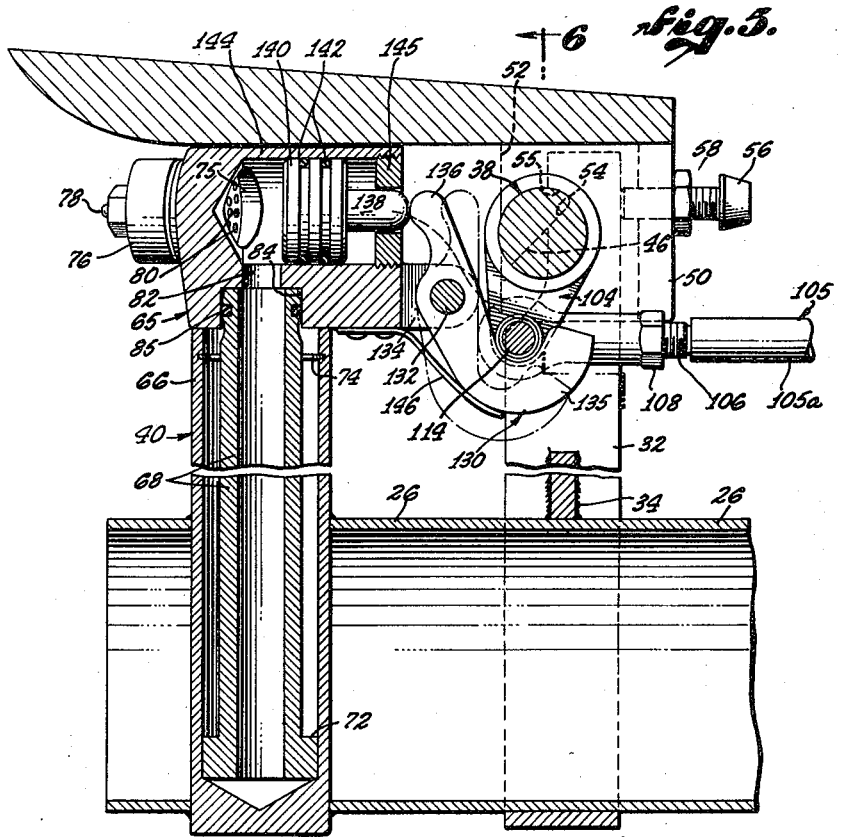
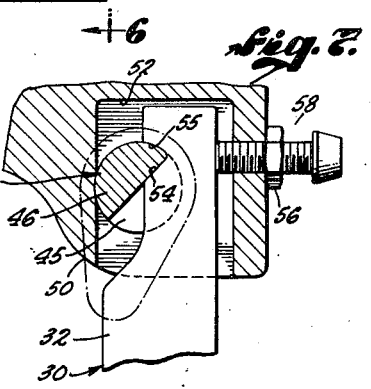
JOHN V. LANDRY,
INVENTOR.
BY George W. Smyth
ATTORNEY.

United States Patent Office 2,948,563
Patented Aug. 9, 1960

2,948,563

MEANS FOR RELEASABLY MOUNTING A STORE ON AN AIRCRAFT

John V. Landry, Manhattan Beach, Calif., assignor to Pastushin Aviation Corporation, Los Angeles, Calif., a corporation Filed Sept. 28, 1955, Ser. No. 537,090

6 Claims. (Cl. 294—83)

This invention relates to means for mounting a jettisonable store, such as an auxiliary fuel tank, on an airborne vehicle or aircraft in a releasable manner and for applying force to the released store to thrust the store away from the aircraft. The invention is specifically directed to a particular engagement means for releasably holding the store and is also specifically directed to such engagement means in combination with fluid-pressure-actuated ejector means for exerting ejection force against two spaced points of the store.

Broadly described, the means for releasably holding the store comprises a suspension member unitary with the store in combination with a rotary engagement member inside the aircraft for releasable engagement with the suspension member. The rotary engagement member is preferably in the form of a rotary shaft that is partially in the path of withdrawal of the suspension member, this shaft having a peripheral recess to clear the path of withdrawal at a release position of rotation of the shaft. Thus with the shaft engaging the suspension member to support the store, rotation of the shaft to its release position clears the path of withdrawal of the suspension member to release the store.

In the present practice of the invention, two spaced engagement means for releasably holding the store are correlated with two spaced ejectors for separately exerting ejective force against two spaced points of the store and this combination has special utility for use on aircraft capable of flying at supersonic speeds. When an elongated store such as an auxiliary fuel tank is jettisoned from such a high-speed aircraft, it is essential that the whole length of the store be thrust away from the aircraft uniformly. Such action is accomplished in the practice of the present invention by the simultaneous thrust of the two ejectors at two points spaced longitudinally of the store.

A certain problem arises in the use of such a combination on a high-speed aircraft since it is a serious matter for either of the two ejectors to fail to operate and it is a serious matter for either of the two engagement means to fail to release the store. The invention eliminates these serious possibilities by operatively interlocking the two engagement means and by further providing that the two interlocked engagement means do not operate for release of the store unless both of the two ejectors operate.

The invention meets this problem by actuating the two engagement means for release of the store in response to operation of one of the two ejectors and by providing a latch to prevent such release operation, this latch being releasable by the other ejector. Thus if the one of the two ejectors fails to operate, no actuating force is applied to the two engagement means for release of the store and if the other of the two ejectors fails to operate, the latch that is associated therewith keeps the actuating force of the one ejector from being effective. In the preferred practice of the invention the two ejectors comprise ejector guns operated by fluid pressure generated from explosives and the generated fluid pressure actuates the two engagement means as well as the associated latch.

The various features and advantages of the invention will be apparent from the following detailed description taken with the accompanying drawings.

In the drawings, which are to be regarded as merely illustrative:

Figure 1 is a side elevational view of a selected embodiment of the invention for releasably attaching a jettisonable store to an aircraft, the store in this instance being an auxiliary fuel tank;

Figure 2 is a longitudinal section taken as indicated by the line 2—2 of Figure 1;

Figure 3 is a side elevational view partly in section, showing the mechanism for releasably attaching the store to the aircraft;

Figure 4 is a bottom plan view of the portion of the mechanism that is carried by the aircraft;

Figure 5 is an enlarged longitudinal section along the line 5—5 of Figure 4 showing the construction of a forward assembly comprising a forward ejector gun and a forward engagement means associated therewith for releasable engagement with a forward suspension means of the store;

Figure 6 is a transverse section on a reduced scale taken along the angular line 6—6 of Figure 5 showing the forward engagement means in engagement with the cooperating suspension means;

Figure 7 is an enlarged fragmentary section taken as indicated by the line 7—7 of Figure 6;

Figure 8 is a view similar to Figure 7 showing the forward engagement means in its alternate release position; and Figure 9 is a fragmentary longitudinal sectional view on an enlarged scale taken as indicated by the line 9—9 of Figure 4 showing the construction of an aft assembly comprising an aft ejector gun and an aft engagement means in engagement with a cooperating aft suspension means.

Figure 1 shows a store in the form of an auxiliary tank T mounted on the underside of an aircraft wing W by means of a pylon P and an adapter that is generally designated by numeral 20. The adapter 20 is permanently mounted on the underside of the aircraft wing W by special bolts 21 (Figures 1 and 3) in a well known manner and therefore may be considered as an integral part of the airplane wing. The adapter 20 may comprise a forward casting 22 (Figures 3 and 4) and an aft casting 24, these two castings being normally concealed by a sheet metal fairing 25 (Figure 1) that is attached thereto.

The pylon P is permanently attached to the store or auxiliary tank T and therefore may be considered an integral part thereof. The pylon P has an internal frame structure comprising a longitudinal hollow cylindrical beam 26. A pair of what may be termed saddles 28 embrace the cylindrical beam 26 from below and are united with the tank T at longitudinally spaced points for the purpose of supporting the tank from the cylindrical beam.

A pair of what may be termed hangers 30 also encircle the opposite ends of the cylindrical beam 26 and are permanently attached to the beam to serve as forward and aft suspension means for the auxiliary tank T. Each of the hangers or suspension means 30 is U-shaped and provides a pair of upwardy extending arms or individual suspension members 32 which normally extend into the adapter 20 for the purpose of supporting the tank T. The two suspension arms 32 of each suspension means or hanger 30 may be interconnected and braced by a web 34, as best shown in Figure 6. As also shown in Figure 6, each of the two hangers 30 may be made of bar stock with the two arms 32 thickened by added reinforcements 35. A suitable streamlined pylon fairing 36 is mounted on the pylon frame structure and for this purpose may be attached both to the saddles 28 and to the hangers 30.

The forward hanger 30 is part of what may be termed a forward assembly that includes a forward rotary engagement means 38 and a forward ejector gun, generally designated 40, the engagement means being adapted to releasably engage the forward hanger and being releasable in response to operation of the ejector gun. In like manner, the aft hanger 30 is part of an aft assembly in which a rotary engagement means 42 normally engages the hanger and is releasable in response to the operation of an aft ejector gun 44.

Each of the two rotary engagement means 38 and 42 may be in the form of a suitably journalled transverse shaft and each shaft is cut away at spaced points to provide a pair of semi-circular peripheral recesses 45 as best shown in Figures 6, 7, and 8. The remaining semi-circular portions 46 of the shafts 38 and 42 adjacent the peripheral recesses 45 constitute what may be termed engagement elements for releasable engagement with the corresponding suspension arms 32 of the hangers 30. As indicated at 48 in Figure 3, one end of each of the shafts 38 and 42 may be formed with a suitable socket 48 to receive a tool whereby the shaft may be manually rotated when desired. These sockets are accessible through corresponding apertures in the adapter fairing 25 as may be seen in Figure 1.

The forward shaft 38 is suitably journalled in a pair of spaced downwardly extending ears 50 of the forward casting 22 and, as best shown in Figure 4, each of these ears has a downwardly opening recess 52 to receive the corresponding suspension arm 32 of the forward hanger 30. The upper end of each of the suspension arms 32 is of reduced width and is dimensioned to extend slidingly through the corresponding semi-circular recess 45 of the shaft 38. This upper portion of each suspension arm 32 is cut away to form a recess 54 having a surface or shoulder 55 that is of circular configuration to conform to the circular periphery of the corresponding semi-circular engagement portion or element 46 of the shaft.

With the two forward suspension arms 32 inserted upward into the recesses 52 of the ears 50, as shown in Figure 8, the forward shaft 38 may be rotated clockwise to cause the two semi-circular engagement portions or elements 46 to engage the corresponding two shoulders 55 as shown in Figure 7. In this manner, the forward hanger 30 is releasably engaged by the forward shaft 38 to releasably support the forward portion of the auxiliary fuel tank T.

To keep each of the suspension arms 32 in snug engagement with the corresponding engagement portions 46 of the shaft 38, suitable means is required to keep the suspension arm from moving laterally away from the shaft. For this purpose, each of the ears 50 of the forward casting 22 may be provided with a suitable screw 56 extending into the recess 54 of the ear. Each of the screws 56 carries a lock nut 58 to hold the screw at its adjusted position, the screw being adjusted for abutment against the suspension arm as shown in Figure 7.

The rear cross shaft 42 is journalled in the aft casting 24 in the same general manner and is formed with similar peripheral recesses 45 and adjacent engagement portions or elements 46 for cooperation with corresponding recesses 54 and shoulders 55 of the upwardly extended suspension arms 32 of the aft hanger 30. As shown in Figure 4, suitable screws 60 provided with lock nuts 62 are mounted in lateral flanges 64 of the aft casting 24 to serve the same purpose as the previously mentioned screws 56.

The forward ejector gun 40 includes a breech 65, a cylinder or gun barrel 66 and a hollow piston 68 inside the gun barrel. The breech 65 is permanently mounted inside the adapter 20 and for that purpose may be attached to the underside of the forward casting 22 by means of suitable screws 70 as best shown in Figure 4.

The gun barrel 66 is structurally separate from the breech 65 and is permanently mounted in the pylon P. As shown in Figure 5, the gun barrel may extend through the cylindrical beam 26 of the pylon and may be welded thereto as indicated.

The hollow piston 68 is movable upward relative to the gun barrel 66 for ejection thrust against the breech 65. As shown in Figure 5, the lower end of the piston 68 may be formed with a circumferential shoulder 72 and a split ring 74 may be mounted in a circumferential groove inside the gun barrel 66 for cooperation with the shoulder 72. Thus when the piston 68 completes its forward stroke to eject the pylon and fuel tank away from the aircraft, the split ring 74 contacts the piston shoulder 72 to jerk the piston away from the aircraft.

The breech 65 includes a pair of combustion chambers 75 to receive explosive charges in the form of the usual cartridges and for this purpose the two combustion chambers are provided with removable screw-threaded caps 76. Each of the two caps 76 is provided with the usual ignition means 78 for detonating the explosive charges electrically by remote control. As shown in Figure 5, each of the combustion chambers is spanned by a screen or perforated plate 80 to confine the burning particles.

The two combustion chambers 75 communicate with a common discharge port 82 which leads to a circular recess 84 on the underside of the breech. As shown in Figure 5, the upper end of the hollow piston 68 extends into this circular recess 84 and preferably the piston is provided with an O-ring 85 for sealing engagement with the wall of the circular recess. It is apparent that when explosive charges are detonated in the two combustion chambers 75, the resultant high pressure gases flow through the port 82 into the interior of the barrel 66 through the hollow piston to cause the desired ejection action. A feature of the invention in this regard is that either of the two explosive charges is capable alone of generating sufficient force for the ejection action. Thus the provision of two combustion chambers increases the dependability of the ejector gun.

In like manner the aft ejector gun 44 comprises a breech 86 in combination with a cylinder or gun barrel 88 and a hollow piston 90 inside the gun barrel. The breech 86, which is attached to the aft casting 24 by suitable screws 92 (Figure 4) has a pair of cylindrical combustion chambers 95 provided with the usual removable screw threaded caps 76 and ignition means 78. As indicated in Figure 9, each of the combustion chambers 95 communicates by a bore 96 with a downwardly extending bore 98 which serves as a discharge port. The bore 98 communicates with a circular recess 100 in which the piston 90 is removably seated, the piston being provided with the usual O-ring 85.

Any suitable arrangement may be provided for release rotation of the two engagement shafts 38 and 42 in response to operation of the two ejector guns 40 and 44. As heretofore stated, it is essential that neither of the two engagement shafts 38 and 42 operate alone and it is further essential that the two shafts do not operate unless both of the two ejector guns operate. In the present embodiment of the invention, these safeguards are provided, in part, by operatively interconnecting the two shafts to function as a single release mechanism, in part, by using the aft ejector gun for release actuation of this mechanism and, finally, by providing a latch to prevent release operation of the mechanism, the latch being releasable in response to operation of the forward ejector gun. Thus if only the forward ejector gun operates no actuating force will be applied to the release mechanism and if only the aft ejector gun operates the latch will remain effective to prevent any release operation whatsoever.

For the purpose of operatively interconnecting the two shafts 38 and 42, the shaft 42 is provided with a downwardly extending pair of rocker arms 102, the shaft 38 is provided with a rocker casting 104, and the rocker arms are connected to the rocker casting by two tension members or operating links 105. The tension members 105 are adjustable in length and for this purpose have threaded ends 106 carrying corresponding clevis members 108. The clevis members extend into corresponding slots 110 in the rocker arms 102 and corresponding slots 112 in the rocker casting 104 and are connected to the rocker arms and the rocker casting by flexible pivots 114 in a well known manner.

Preferably, each of the tension members 105 is made in two relatively movable longitudinal sections to permit the tension members to contract in length. This provision for contraction of the tension members 105 is for convenience, the purpose being to make it possible for the aft shaft 42 to be rotated from its release position to its engagement position independently of the forward shaft 38. For this purpose each of the two tension sections 105 may comprise a relatively long section 105a and a relatively short tubular section 105b, the end of the long section 105a telescoping in a sliding manner into the tubular section 105b. The long section 105a carries a cross pin 115 that extends into a short longitudinal slot 116 in the section 105b. Normally the cross pin 115 is at the inner end of the slot 116 as shown in Figure 3 for operation of the tension means in its normal manner.

For the purpose of actuating the two shafts 38 and 42 for rotation from their engagement positions to their release positions, a short actuating arm 118 is mounted on the shaft 42, as best shown in Figures 3 and 9, and this actuating arm is positioned in the path of an actuating plunger 120 (Figure 9) carried by a small auxiliary piston 122. The small auxiliary piston 122, which may be provided with O-rings 124, is slidingly mounted in an auxiliary cylinder 125 of the breech 86. This auxiliary cylinder is in communication with the two combustion chambers 95 through a bore or passage 126 and is closed at its outer end by a cap 128 which is apertured to serve as a guide for the plunger 120. It is apparent that the creation of an abrupt pressure rise inside the breech 86 will cause the piston 122 to advance the plunger 120 against the actuating arm 118 to rotate the shaft 42 to its release position and that the tension members 105 will cause the forward shaft 38 to rotate simultaneously to its release position.

As best shown in Figure 5, the releasable latch that is responsive to the forward ejector gun 40 may comprise a latch member, generally designated 130, that is pivotally mounted by a pivot pin 132 for rotation in a slot 134 of the breech 65. The latch member has a hook-shaped arm 135 for releasable engagement with the rocker casting 104 when the two shafts 38 and 42 are in their engagement position. The latch member also has an upwardly extending release arm 136 that is positioned in the path of movement of a release plunger 138.

The release plunger 138 is carried by a small auxiliary piston 140. The piston 140, which may be provided with O-rings 142, is slidingly mounted in a small auxiliary cylinder 144 of the breech 65. As may be seen in Figure 5, this auxiliary cylinder 144 is in communication with the two combustion chambers 75 of the breech and is closed at its outer end by a bushing 145 which serves as a guide for the release plunger 138. It is apparent that the creation of a pressure rise inside the forward ejector gun 40 by the detonation of explosive charges in the combustion chambers 75 causes the piston 140 to advance the release plunger 138 against the release arm 136 of the latch member 130 to release both of the two shafts 38 and 42 for release rotation. Preferably a suitable leaf spring 146 urges the latch member 130 towards its effective position.

The manner in which this embodiment of the invention operates for its purpose may be readily understood from the foregoing description. With the two hollow pistons 68 and 90 positioned in the corresponding gun barrels 66 and 88, and with both of the shafts 38 and 42 at their release positions it is a simple matter to place the store in its assembled position with respect to the aircraft wing, at which assembled position the two hollow pistons extend into the corresponding recesses 84 and 100 respectively in the two gun breeches 65 and 86. At the assembled positions the forward pair of suspension arms 32 is in position for engagement by the forward rotary shaft 38 and the aft pair of suspension arms is in position for engagement by the aft rotary shaft 42. By the application of a suitable tool to the socket 48 of the aft shaft 42, the aft shaft may be rotated into engagement with the corresponding pair of suspension arms 32 independently of the forward shaft 42 since the two tension members 105 are contractable. When the forward shaft 38 is rotated in similar manner to its engagement position, the latch member 130 automatically makes latching engagement with the rocker casting 104. If desired, both shafts 38 and 42 may be rotated simultaneously to their engagement positions by application of a tool to the socket 48 of the forward shaft 38.

When the moment arrives for release of the auxiliary fuel tank T, the pilot closes a firing circuit to detonate the explosive charges in the two ejector guns 40 and 44. When fluid pressure builds up in the two ejector guns to substantial magnitude, the aft ejector gun applies actuating force to the engagement mechanism by means of the actuating plunger 120 acting against the actuating arm 118 and at the same time the forward ejector gun releases the latch member 130 by advancing the release plunger 138 against the release arm 136 of the latch member. The two shafts 38 and 42 are then rotated to their release positions and the two hollow pistons in the two ejector guns thrust against the aircraft for lateral displacement of the fuel tank away from the aircraft. When the two hollow pistons are fully extended, they are jerked away from the aircraft by the split rings 74, as heretofore described.

I claim:
1. In an apparatus for mounting a jettisonable store on an aircraft and for releasing the store with ejective force, the combination of: a forward suspension means and an aft suspension means, both unitary with said store; a forward engagement means and an aft engagement means on said aircraft operable to engage and release said forward and rearward suspension means respectively; tension means operatively interconnecting said two engagement means for simultaneous release actuation, said tension means having relatively movable longitudinal sections for contraction of the tension means to permit the two engagement means to function independently for individual engagement with the corresponding suspension means; a forward fluid-pressure-actuated ejector and an aft fluid-pressure-actuated ejector to exert ejective force against said store at forward and aft positions respectively; means to latch said two engagement means against release operation; means responsive to one of said ejectors to actuate said two engagement means for release of said two suspension means; and means responsive to the other ejector to release said latch, whereby the two engagement means are actuated to release said store only if both of the ejectors operate.

2. A combination as set forth in claim 1 in which said two ejectors include corresponding combustion chambers for generation of actuating fluid pressure; and in which said two responsive means include two pistons responsive to pressure rises in said two combustion chambers respectively.

3. In an apparatus for mounting a jettisonable store on an aircraft and for releasing the store with ejective force, the combination of: a forward suspension means and an aft suspension means both unitary with said store, each having at least one shoulder directed towards the store; a forward rotary engagement means and an aft rotary engagement means for cooperation with said two suspension means, respectively, each of said rotary engagement means being mounted on said aircraft adjacent the path of withdrawal of the corresponding suspension means and each having a cross-sectional configuration of less than a full circle, each of said engagement means being rotatable on its axis between a holding position in engagement with the shoulder of the corresponding suspension means and a release position out of the path of withdrawal of the shoulder to release the suspension means; a forward ejector and an aft ejector to exert force against said store at longitudinally spaced points thereon; means responsive to one of said ejectors to release both of said engagement means; and a latch to prevent release of the two engagement means, said latch being releasable in response to operation of the other ejector.

4. A combination as set forth in claim 3 in which both of said ejectors are fluid-pressure-actuated; and which includes means responsive to the fluid pressure of one ejector to release the two engagement means and means responsive to the other ejector to release said latch.

5. A combination as set forth in claim 3 in which said two engagement means comprise two rotary shafts in the paths of withdrawal of the shoulders of the corresponding suspension members, said shafts having peripheral recesses to clear said paths at the release positions of rotation of the two shafts, said two shafts being interconnected for release rotation in unison.

6. A combination as set forth in claim 3 in which each of said suspension means has two shoulders spaced laterally with respect to the direction of flight; and in which each of said engagement means comprises a laterally extending rotary shaft in the path of withdrawal of the two shoulders, said shaft having two peripheral recesses to clear the paths of withdrawal of the two shoulders respectively at the release position of rotation of the shaft.

References Cited in the file of this patent

UNITED STATES PATENTS

| | | |
|---|---|---|
| 1,461,426 | Lisowski | July 10, 1923 |
| 2,147,550 | Sabathe | Feb. 14, 1939 |
| 2,466,980 | Bronson | Apr. 12, 1949 |
| 2,549,785 | Douglas | Apr. 24, 1951 |
| 2,699,908 | Fletcher | Jan. 18, 1955 |
| 2,856,224 | Kelly | Oct. 14, 1958 |

FOREIGN PATENTS

| | | |
|---|---|---|
| 798,522 | France | May 19, 1936 |